Patented Oct. 11, 1938

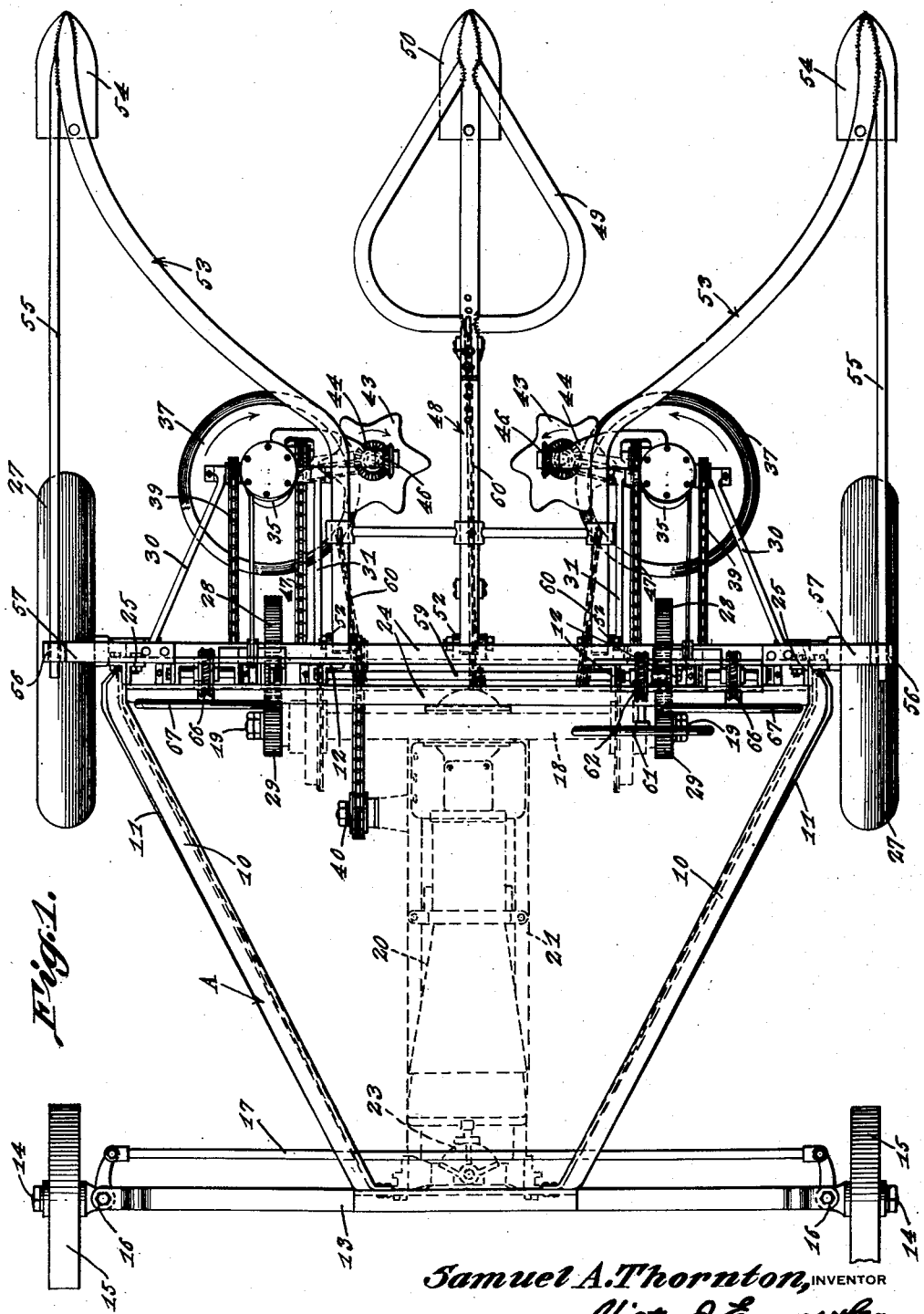

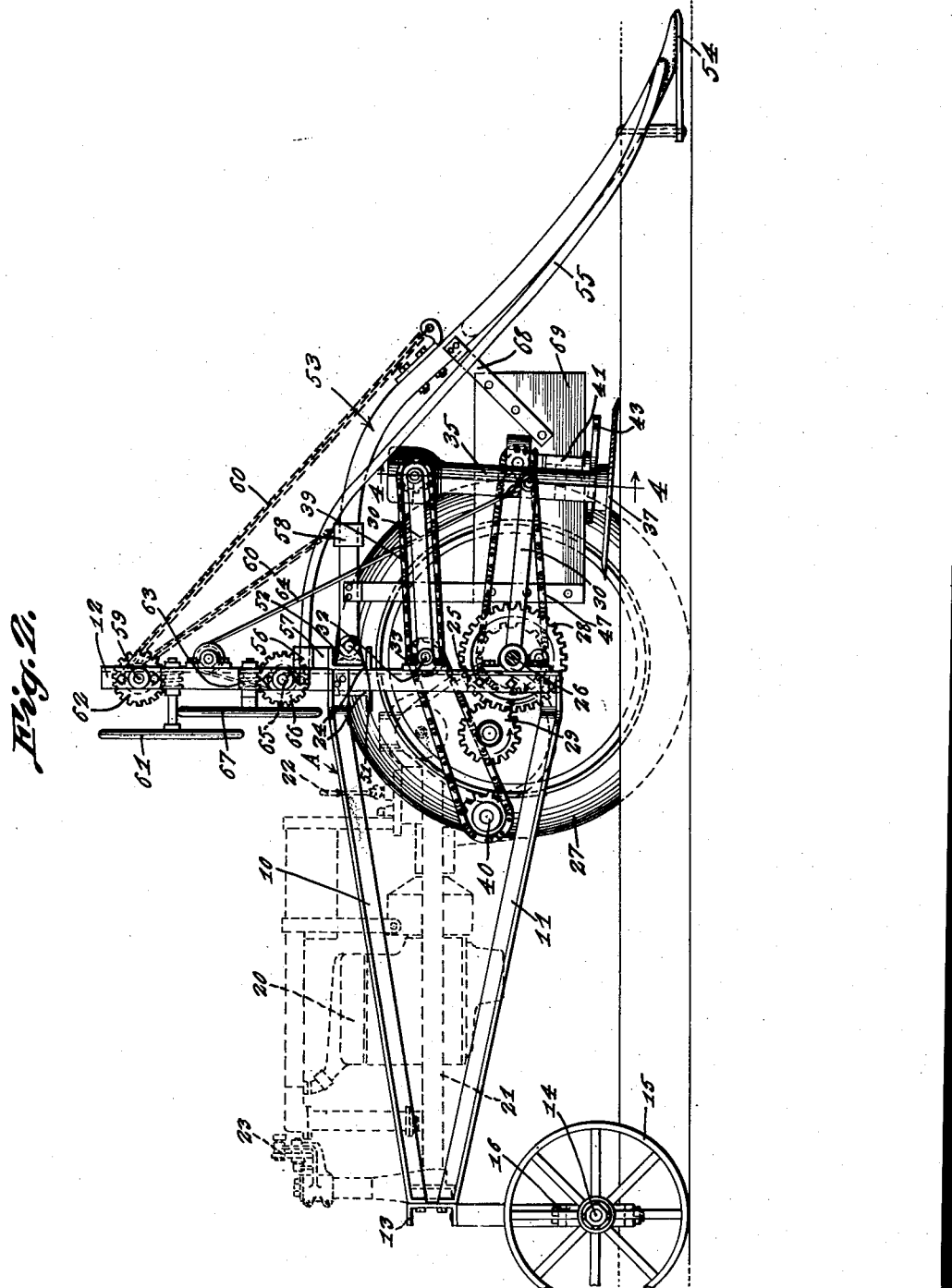

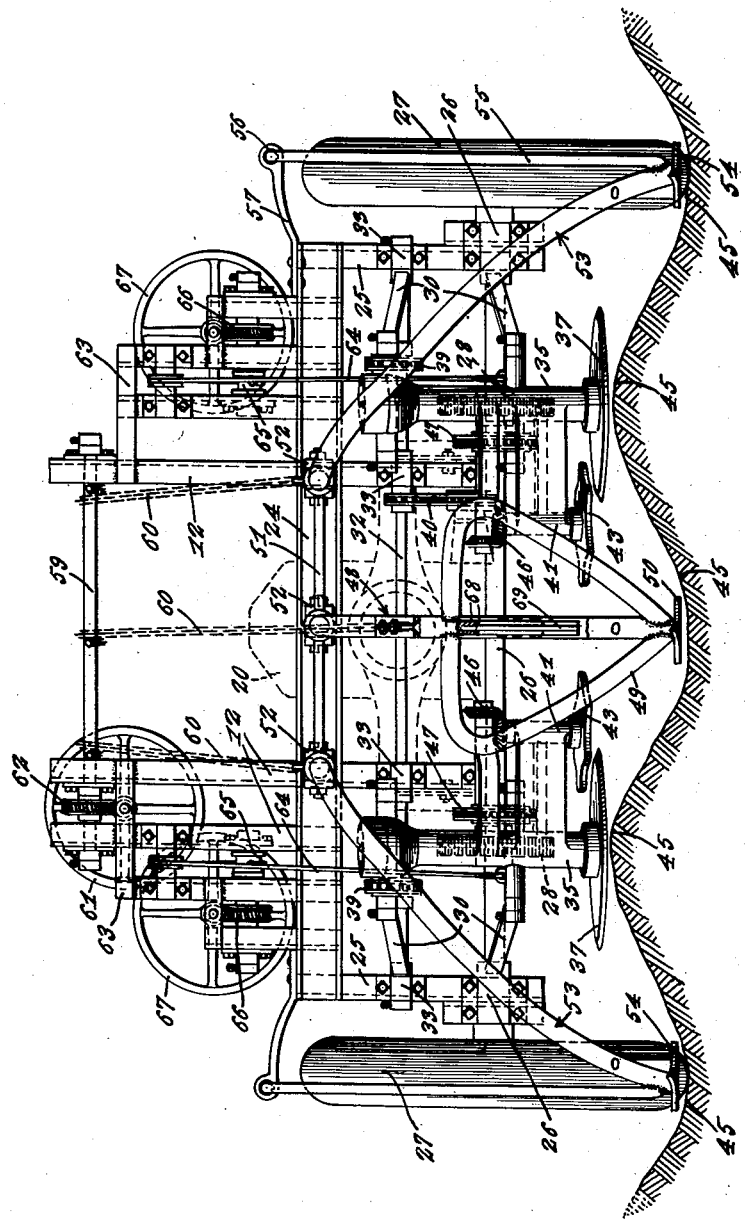

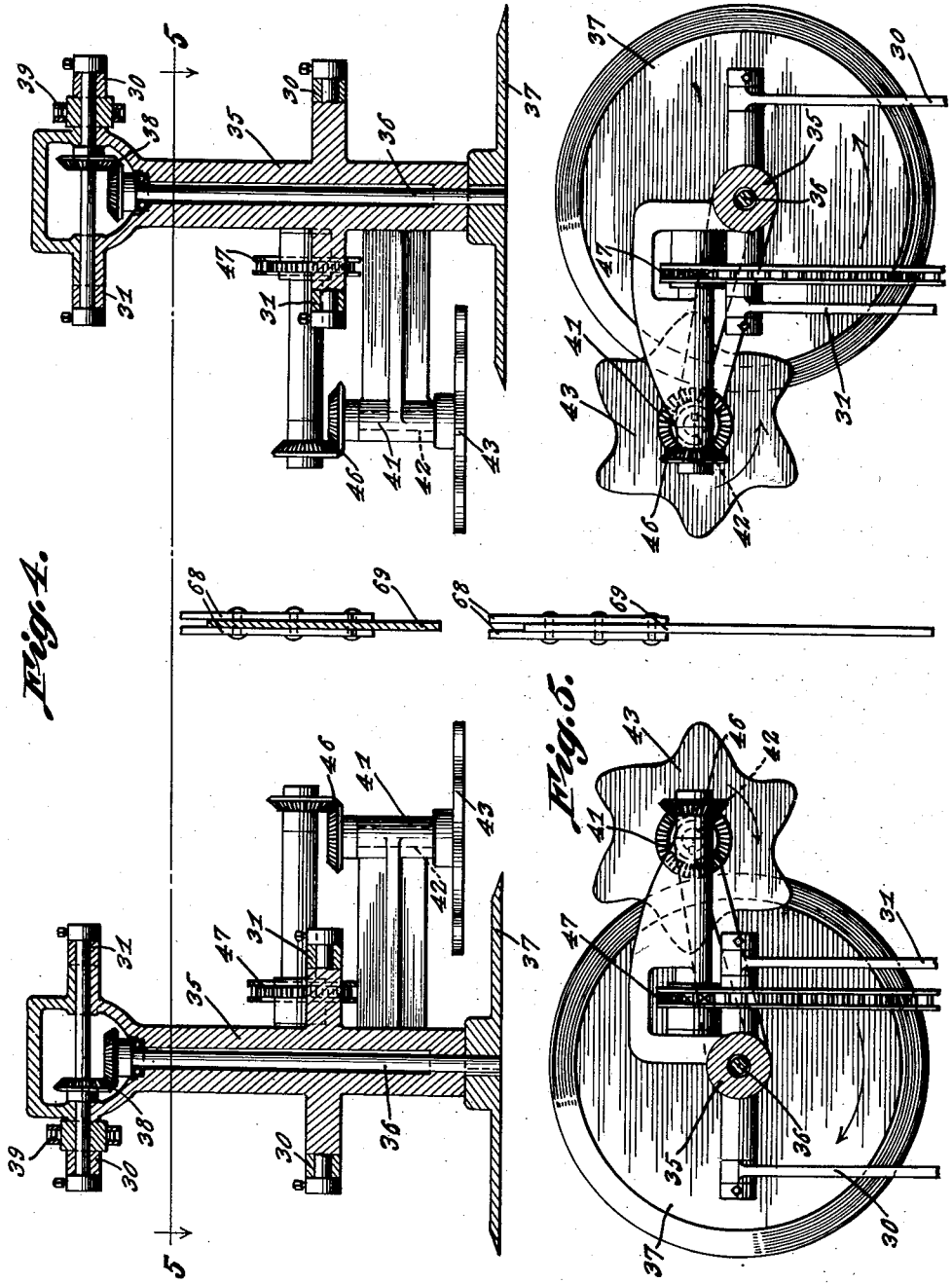

2,133,217

UNITED STATES PATENT OFFICE 2,133,217

WINDROWING MACHINE

Samuel A. Thornton, Jeanerette, La.

Application January 31, 1938, Serial No. 187,944

8 Claims. (Cl. 56—15)

The invention relates to a wind-rowing machine and more especially to sugar cane windrowing machines.

The primary object of the invention is the provision of a machine of this character, wherein the same is of tractor type and serves to cut a pair of adjacent rows of cane close to or near the ground and deposit the latter in a wind-row area between the rows and in this fashion stacking the cut material into a form known as a wind-row, the cutters and adjuncts thereof as well as the kickers for the cut material being susceptible of adjustment.

Another object of the invention is the provision of a machine of this character, wherein the same receives its power from a tractor and the knives or cutters and kickers are driven by such power so that wind-rowing of standing crops can be carried forth with dispatch and automatically thereby eliminating the hand cutting and windrowing of the crop particularly sugar cane, which is tedious and costly through hand work.

A further object of the invention is the provision of a machine of this character, wherein the construction thereof is novel in its entirety as the cutters and revolving kickers are mounted so that the machine when traveling through a field will straddle adjacent rows of growing crops and will cut the cane for the positive deposit thereof in a wind-row between the rows straddled without liability of tangling or irregular deposit of the stalks after the cutting thereof.

A still further object of the invention is the provision of a machine of this character, wherein the same is under the control of an operator and is power driven.

A still further object of the invention is the provision of a machine of this character, which is simple in construction, thoroughly reliable and efficient in operation, readily and easily adjusted for proper wind-rowing action, strong, durable, and inexpensive to manufacture.

With these and other objects in view, the invention consists in the features of construction, combination and arrangement of parts as will be hereinafter more fully described, illustrated in the accompanying drawings, which disclose the preferred embodiment of the invention and pointed out in the claims hereunto appended.

In the accompanying drawings:

Figure 1 is a top plan view of a machine constructed in accordance with the invention.

Figure 2 is a side elevation partly in section thereof.

Figure 3 is a front elevation.

Figure 4 is an exploded sectional view taken on the line 4—4 of Figure 2 looking in the direction of the arrows.

Figure 5 is an exploded sectional view taken on the line 5—5 of Figure 4 looking in the direction of the arrows.

Similar reference characters indicate corresponding parts throughout the several views in the drawings.

Referring to the drawings in detail, the machine constituting the present invention comprises a chassis A involving rearwardly convergent upper and lower side sills 10 and 11, respectively, which are joined forwardly with uprights 12, while rearwardly the said sills are joined with a rear axle 13 supporting turn knuckle wheel spindles 14 on which are journaled rear steering wheels 15, the knuckles 16 being pivoted to a cross tie rod 17 so that the knuckles will turn in unison and steering of the wheels 15 may be had in any conventional manner similar to standard tractors. The uprights have bracketed thereto an axle housing 18 incasing a differential mechanism (not shown) for a pair of driving axles 19 as fitted within the said axle housing 18, the differential mechanism being driven from a power shaft (not shown) of an internal combustion engine 20 having its bed 21 supported within the chassis A, the transmission control for the motor 20 being indicated at 22 while the steering mechanism is identified generally at 23.

At the required elevation and built with the uprights 12 at opposite sides thereof are cross sills or channeled beams 24 having fitted at their outer ends depending hangers 25 in which are journaled the axles 26 carrying front traction wheels 27, these through gearing 28 and 29, respectively, are driven by the axles 19.

Extending forwardly from the uprights 12 and the hangers 25 are vertically swinging, forwardly convergent outer and inner straight upper and lower supporting arms 30 and 31, respectively, the upper arms 30 and 31 being arbored at their rear ends for pivotal mounting upon a driven shaft 32 journaled in bearings 33 fixed to the uprights 12 and the hangers 25. This shaft 32 is horizontally arranged while the lower arms 30 and 31 at their rear ends are pivoted at 34 to the said uprights and hangers. The outer or forward ends of the upper and lower arms 30 and 31 are pivoted to shaft colums 35 which are arranged in an upright position and are spaced from each other while journaled within each column is a cutter driving shaft 36 to which is fixed at the lower end of said columns a rotary disk-like cutter 37. This shaft 36 through gearing connections 38 at its upper end and chain and sprocket connections 39 is driven from the shaft 32, which latter from a power take-off 40 is operated from the motor 20 so that in this manner power is transmitted to the cutters from the said motor for the operation of such cutters.

Extending from the columns 35 inwardly with respect thereto are bearing brackets 41 in which are journaled the arbors 42 of rotary fluted kickers 43, these being slightly elevated with respect to the cutters 37 which are dipped or slightly inclined in a forward direction and are adapted to work close to a hill 44 on the straddling of the machine of a pair of adjacent rows for the cutting of said adjacent rows of growing cane while such cutters 37 are separated from each other and similarly the rotary kickers 43 to afford a clearance therebetween and confronting a wind-rowing area 45 medially with relation to the row or hills 44 adjacent each other.

The arbors 42 each through gearing 46 and sprocket gear and chain connections 47, respectively, are driven from the axles 26 carrying the wheels 27.

Arranged at the longitudinal median of the chassis A for vertical swinging movement and extended forwardly and downwardly between the path of the rotary cutters 37 is a carrier arm 48 supporting a wind-rowing bow 49 which in its framing is of substantially heart shape with the smaller end directed outwardly and provided with a shoe 50, the arm being of an extensible type for the adjustment of the bow 49 and is swingable vertically on a pivot rod 51 suitably supported at 52 on the forward sill or beam 24 intermediate thereof. This pivot rod 51 has swingably connected therewith at opposite sides of the arm 48 forwardly and downwardly extended laterally spread lifter rails 53, these provided at their outer ends with shoes 54 while associated with said rails 53 are upwardly curved antennae 55 which extend from the forward ends of said rails rearwardly and play through guide eyes 56 formed at the outer ends of laterally extended stationary supports 57 fixed to opposite ends of the forward cross sill 24. The arm 48 carries a tie rod 58 coupling it with the lifter rails 53 and being disposed crosswise with relation to said arm.

Suitably journaled between the uprights 12 above the chassis A is a winding and unwinding shaft or windlass 59 for lifter chains 60, these being connected to the tie rod 58, being three in number, one for the arm 48 and two for the several lifter rails 53 and this shaft or windlass 59 is manually turned by a hand wheel 61, which has worm screw and gear connection 62 with the said shaft or windlass 59. The uprights are supplemented by stand frames 63 rising from the sills 24 and suitably built therewith.

Associated with the columns 35 are lifting cables 64 adapted to be wound on and unwound from windlasses 65 journaled in the stand frames 63 and through gearing 66 operated by hand wheels 67 are turned or actuated for the winding and unwinding of the cables 64 on and from the same and in this manner the cutters 37 together with the kickers 43 are raised and lowered relative to working position for the cutting and wind-rowing of growing crops such as sugar cane. The chains 66 in association with the shaft or windlass 59 raise and lower in unison the wind-rowing bow frame 49 and the rails 53, respectively. Thus it can be readily seen that the cutters, kickers, wind-rowing bow and rails hereinbefore mentioned are susceptible of hand adjustment by an operator of the machine.

The arm 48 through brackets 68 suspend therefrom a plate-like guard 69 which is arranged perpendicular and disposed in this position at the longitudinal median of the chassis A of the machine in rear of the bow 49 and functions to avoid the tangling or irregular wind-rowing of the cut crop when deposited in the wind-row area 45 between the rows 44 when the machine is advanced for wind-rowing activity or operation.

The rails 53 serve to gather and direct the standing cane stalks into the path of the cutters 37 which sever these stalks close to the ground while the kickers 43 simultaneously function to deliver the cut stalks and the wind-rowing of the same into the area 45 between the hills or rows 44 as the machine is advanced.

What is claimed is:

1. A machine of the kind described comprising a chassis, steering wheels supported rearwardly of said chassis, driving wheels forwardly of said chassis, an axle housing between said driving wheels, uprights on said chassis and supporting said housing, a power unit carried in the chassis, axles within said housing and having differential gearing connections with the power unit, stud axles carrying said driving wheels, gear connections between the axles, rotatable cutters vertically adjustable forwardly of the chassis and operating on vertical axis, vertically swinging lifter arms outwardly with respect to said cutters and forwardly of said chassis, rotatable kickers associated with said cutters and located inwardly with respect thereto, antennae associated with the lift arms, and a wind-row bow arranged medially with respect to the arms forwardly of said chassis.

2. A machine of the kind described comprising a chassis, steering wheels supported rearwardly of said chassis, driving wheels forwardly of said chassis, an axle housing between said driving wheels, uprights on said chassis and supporting said housing, a power unit carried in the chassis, axles within said housing and having differential gearing connections with the power unit, stud axles carrying said driving wheels, gear connections between the axles, rotatable cutters vertically adjustable forwardly of the chassis and operating on vertical axis, vertically swinging lifter arms outwardly with respect to said cutters and forwardly of said chassis, rotatable kickers associated with said cutters and located inwardly with respect thereto, antennae associated with the lift arms, a wind-row bow arranged medially with respect to the arms forwardly of said chassis, and a vertical fender associated with said bow and being rearwardly thereof between the kickers.

3. A machine of the kind described comprising a chassis, steering wheels supported rearwardly of said chassis, driving wheels forwardly of said chassis, an axle housing between said driving wheels, uprights on said chassis and supporting said housing, a power unit carried in the chassis, axles within said housing and having differential gearing connections with the power unit, stud axles carrying said driving wheels, gear connections between the axles, rotatable cutters vertically adjustable forwardly of the chassis and operating on vertical axis, vertically swinging lifter arms outwardly with respect to said cutters and forwardly of said chassis, rotatable kickers associated with said cutters and located inwardly with respect thereto, antennae associated with the lift arms, a wind-row bow arranged medially with respect to the arms forwardly of said chassis, a vertical fender associated with said bow and being rearwardly thereof between the kickers, and a power take-off from said power unit for driving the cutters and kickers.

4. A machine of the kind described comprising a chassis, steering wheels supported rearwardly of said chassis, driving wheels forwardly of said chassis, an axle housing between said driving wheels, uprights on said chassis and supporting said housing, a power unit carried in the chassis, axles within said housing and having differential gearing connections with the power unit, stud axles carrying said driving wheels, gear connections between the axles, rotatable cutters vertically adjustable forwardly of the chassis and operating on vertical axis, vertically swinging lifter arms outwardly with respect to said cutters and forwardly of said chassis, rotatable kickers associated with said cutters and located inwardly with respect thereto, antennae associated with the lift arms, a wind-row bow arranged medially with respect to the arms forwardly of said chassis, a vertical fender associated with said bow and being rearwardly thereof between the kickers, a power take-off from said power unit for driving the cutters and kickers, and means for raising and lowering the lift arms.

5. A machine of the kind described comprising a chassis, steering wheels supported rearwardly of said chassis, driving wheels forwardly of said chassis, an axle housing between said driving wheels, uprights on said chassis and supporting said housing, a power unit carried in the chassis, axles within said housing and having differential gearing connections with the power unit, stud axles carrying said driving wheels, gear connections between the axles, rotatable cutters vertically adjustable forwardly of the chassis and operating on vertical axis, vertically swinging lifter arms outwardly with respect to said cutters and forwardly of said chassis, rotatable kickers associated with said cutters and located inwardly with respect thereto, antennae associated with the lift arms, a wind-row bow arranged medially with respect to the arms forwardly of said chassis, a vertical fender associated with said bow and being rearwardly thereof between the kickers, a power take-off from said power unit for driving the cutters and kickers, means for raising and lowering the lift arms, and means for raising and lowering the cutters and kickers together.

6. A machine of the kind described comprising a chassis, steering wheels supported rearwardly of said chassis, driving wheels forwardly of said chassis, an axle housing between said driving wheels, uprights on said chassis and supporting said housing, a power unit carried in the chassis, axles within said housing and having differential gearing connections with the power unit, stud axles carrying said driving wheels, gear connections between the axles, rotatable cutters vertically adjustable forwardly of the chassis and operating on vertical axis, vertically swinging lifter arms outwardly with respect to said cutters and forwardly of said chassis, rotatable kickers associated with said cutters and located inwardly with respect thereto, antennae associated with the lift arms, a wind-row bow arranged medially with respect to the arms forwardly of said chassis, a vertical fender associated with said bow and being rearwardly thereof between the kickers, a power take-off from said power unit for driving the cutters and kickers, means for raising and lowering the lift arms, and means for raising and lowering simultaneously the cutters, kickers and wind-row bow.

7. A machine of the kind described comprising a chassis, steering wheels supported rearwardly of said chassis, driving wheels forwardly of said chassis, an axle housing between said driving wheels, uprights on said chassis and supporting said housing, a power unit carried in the chassis, axles within said housing and having differential gearing connections with the power unit, stud axles carrying said driving wheels, gear connections between the axles, rotatable cutters vertically adjustable forwardly of the chassis and operating on vertical axis, vertically swinging lifter arms outwardly with respect to said cutters and forwardly of said chassis, rotatable kickers associated with said cutters and located inwardly with respect thereto, antennae associated with the lift arms, a wind-row bow arranged medially with respect to the arms forwardly of said chassis, a vertical fender associated with said bow and being rearwardly thereof between the kickers, a power take-off from said power unit for driving the cutters and kickers, means for raising and lowering the lift arms, means for raising and lowering simultaneously the cutters, kickers and wind-row bow, and means manually controlling the raising and lowering means for the lift arms and the cutters, kickers and bow.

8. A machine of the kind described comprising a chassis, steering wheels supported rearwardly of said chassis, driving wheels forwardly of said chassis, an axle housing between said driving wheels, uprights on said chassis and supporting said housing, a power unit carried in the chassis, axles within said housing and having differential gearing connections with the power unit, stud axles carrying said driving wheels, gear connections between the axles, rotatable cutters vertically adjustable forwardly of the chassis and operating on vertical axis, vertically swinging lifter arms outwardly with respect to said cutters and forwardly of said chassis, rotatable kickers associated with said cutters and located inwardly with respect thereto, antennae associated with the lift arms, a wind-row bow arranged medially with respect to the arms forwardly of said chassis, a vertical fender associated with said bow and being rearwardly thereof between the kickers, a power take-off from said power unit for driving the cutters and kickers, means for raising and lowering the lift arms, means for raising and lowering simultaneously the cutters, kickers and wind-row bow, means manually controlling the raising and lowering means for the lift arms and the cutters, kickers and bow, and shoes associated with said lift arms and bow.

SAMUEL A. THORNTON.